United States Patent
Katchmart

(10) Patent No.: US 10,832,716 B2
(45) Date of Patent: Nov. 10, 2020

(54) ZONE SELF SERVO WRITING WITH SYNCHRONIZED PARALLEL CLOCKS

(71) Applicant: Marvell World Trade Ltd., St. Michael (BB)

(72) Inventor: Supaket Katchmart, San Jose, CA (US)

(73) Assignee: MARVELL ASIA PTE, LTD., Singapore (SG)

( * ) Notice: Subject to any disclaimer, the term of this patent is extended or adjusted under 35 U.S.C. 154(b) by 0 days.

(21) Appl. No.: 16/715,559

(22) Filed: Dec. 16, 2019

(65) Prior Publication Data

US 2020/0202893 A1 Jun. 25, 2020

Related U.S. Application Data

(60) Provisional application No. 62/782,211, filed on Dec. 19, 2018.

(51) Int. Cl.
| | |
|---|---|
| G11B 5/596 | (2006.01) |
| G11B 20/10 | (2006.01) |
| G11B 20/12 | (2006.01) |
| G11B 5/00 | (2006.01) |

(52) U.S. Cl.
CPC ...... *G11B 5/59666* (2013.01); *G11B 5/59661* (2013.01); *G11B 20/1024* (2013.01); *G11B 20/1251* (2013.01); *G11B 2005/0021* (2013.01); *G11B 2020/1284* (2013.01)

(58) Field of Classification Search
CPC .......... G11B 5/09; G11B 20/10; G11B 20/12; G11B 27/36; G11B 20/10222; G11B 5/00; G11B 5/52; G11B 5/59633; G11B 5/59638; G11B 5/59655

USPC ................. 360/48, 31, 39, 51, 70, 75, 77.08
See application file for complete search history.

(56) References Cited

U.S. PATENT DOCUMENTS

| | | | |
|---|---|---|---|
| 7,230,789 B1 | 6/2007 | Brunnett et al. | |
| 7,688,534 B1 | 3/2010 | McCornack | |
| 8,027,117 B1 | 9/2011 | Sutardja et al. | |
| 8,169,735 B1 | 5/2012 | Sutardja et al. | |
| 8,325,433 B2 * | 12/2012 | Zhang ............ | G11B 20/10027 360/39 |
| 8,462,458 B1 | 6/2013 | Ton-That et al. | |
| 8,508,879 B1 | 8/2013 | Zou et al. | |
| 8,687,308 B1 | 4/2014 | Katchmart | |
| 9,431,052 B2 | 8/2016 | Oberg et al. | |
| 2008/0013202 A1 | 1/2008 | Shepherd et al. | |

OTHER PUBLICATIONS

Nie, et al., "Control Design of Hard Disk Drive Concentric Self-Servo Track Writing via H2 and H∞ Synthesis", IEEE Transactions on Magnetics, vol. 47, No. 7, Jul. 2011, 7 pages.
European Search report for European Application No. EP 19 21 7455 dated Apr. 17, 2020.

\* cited by examiner

*Primary Examiner* — Nabil Z Hindi

(57) ABSTRACT

Zone self-servo write (SSW) technology is disclosed that leverages two clock signals synchronized in parallel to transition between zones to write servo patterns at different frequencies while minimizing error rate despite the different frequencies. Two separate clock signals ("clocks") are used to locate and lock to different reference spirals. By updating both clocks in parallel instead of in series, error rate for writing while stepping up frequency across zones is reduced.

20 Claims, 6 Drawing Sheets

ZONE SELF SERVO WRITING WITH SYNCHRONIZED PARALLEL CLOCKS

CROSS-REFERENCE TO RELATED PATENT APPLICATION

In accordance with 35. U.S.C. § 119(e), this non-provisional patent application claims benefit of the filing date of U.S. Provisional Patent Application 62/782,211, which was filed 2018 Dec. 19. In addition, this patent application incorporates by reference the entirety of the disclosure of U.S. Provisional Patent Application 62/782,211.

FIELD OF USE

The disclosure generally relates to storage devices and self-servo writing.

BACKGROUND

With self-servo writing (SSW), a fully enclosed hard disk drive (HDD) uses its read/write head to write patterns of servo control signal information that are used to generate position feedback signals to control the read/write head via servo motors over the medium of a storage device. For spiral SSW, the HDD begins with writing initial or "coarse" reference spirals. The coarse reference spirals are sets of time data written in highly ramped spirals between the outer and inner diameter of the disk using the disk head read/write arm stops and positioning motors. The coarse reference spirals may not be regularly or evenly spaced. Once written, the read head reads and "learns" the locations of the data of the coarse reference spirals. These coarse reference spiral locations are then referenced for the write head to write more refined location data as "intermediate" reference spirals. The intermediate reference spirals are less ramped than the coarse spirals and contain more precise time data. Once the intermediate spirals are written, the read head reads and "learns" the locations of the data of the intermediate spirals. From this finer location data, the HDD writes final servo control signal patterns along concentric arcs as "servo wedges." In zoned SSW, the intermediate spirals are written at different frequencies in different portions of the disk.

BRIEF DESCRIPTION OF THE DRAWINGS

Aspects of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to a single read head in illustrative examples. Aspects of this disclosure can be also applied to multiple read heads. In other instances, well-known instruction instances, protocols, structures and techniques have not been shown in detail in order not to obfuscate the description.

Overview

Zone self-servo write (SSW) technology is disclosed that leverages two clock signals synchronized in parallel to transition between zones to write servo patterns at different frequencies while minimizing error rate despite the different frequencies. A non-transitory storage device uses two separate clock signals (hereinafter "clock" will be used instead of clock signal) to variously track and write location data to a blank disk. By using a first clock to track location on the disk in reference to already written location data, and a second clock to write new location data, the angular frequency of location data being written may be varied from the read data. Using two clocks allows the frequency to be stepped up twice, from a coarse spiral frequency to an intermediate spiral frequency and from the intermediate spiral frequency to a final servo frequency. Because angular frequency of the written data varies in zones as a function of radial position, the servo frequency is not limited by the linear or angular data density restrictions of the inner diameter. The amount of disk space occupied by the servo data outside the innermost zone is reduced by writing the required servo pattern data at higher frequency with greater angular data density. By updating both clocks in parallel instead of in series, error rate for writing while stepping up frequency is also reduced.

Example Illustrations

Figure 1:
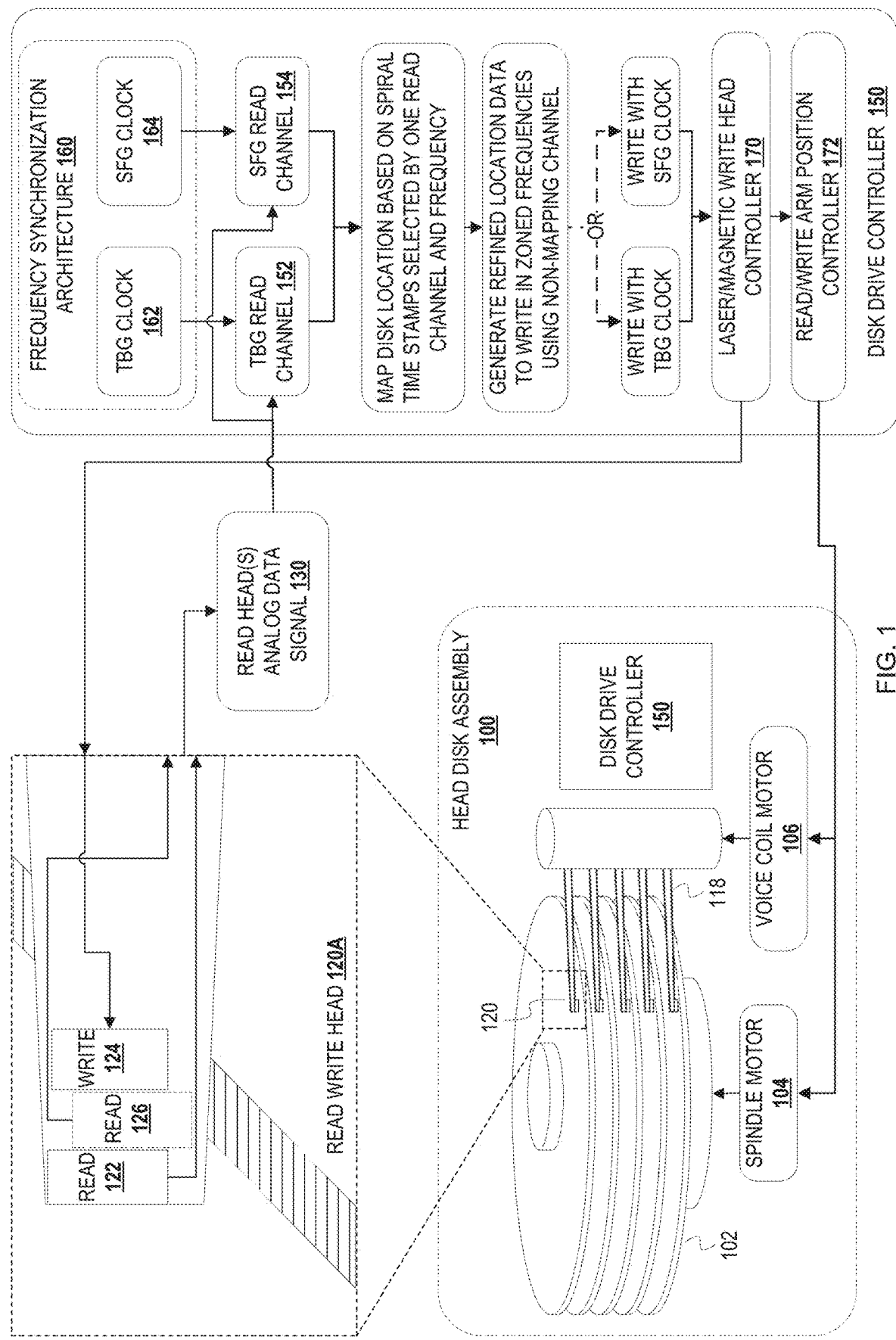
FIG. 1 depicts a diagram of selected components of a hard disk drive (HDD) with a dual read channel self-servo write (SSW) system.

FIG. 1 depicts a diagram of selected components of a hard disk drive (HDD) with a dual read channel self-servo write (SSW) system. The head disk assembly (HDA) 100 contains a set of read write/heads 120, a disk or set of disks 102, a spindle motor 104, a voice coil motor (VCM) 106, a set of read/write arms 118, and a disk drive controller 150. The disks 102 can be coated with a magnetic material such that data can be written to one or both sides and subsequently read using the read/write heads 120. The spindle motor 104 rotates the disks around a central axis. The VCM 106 positions the read/write arms 118 over the magnetic data on the disks 102. The VCM 106 can instead be a stepper motor. The read/write arms 118 can be pivoting or sliding arms, can be spring loaded or use air gap technology to maintain flying head height.

FIG. 1 illustrates select components of a read/write head 120A of the read/write heads 120. The read/write head 120A contains a read head 122 and a write head 124. FIG. 1 depicts read head 126 in dashed lines since this additional head is not necessary in an implementation. The read head 122 and write head 124 are separated by a distance such that the magnetic fields generated at the write head 124 do not impact the read head's 122 ability to detect magnetic polarity. The read head(s) and write head may be offset from one another both along the axis of the read/write arm 118 and along the axis orthogonal to the read/write arm 118.

The disk drive controller 150 contains circuitry to control the head disk assembly 100 (including spindle motor 104 and VCM 106), read heads 122, 126 and write head 124. This circuitry can include a processor and memory integrated in one or more computer chips or circuit boards or can be contained in a microprocessor-based controller. The disk drive controller 150 analyzes signals from the read head(s)

122, 126, processes positional data, and generates write signals to the write head 124 in order to implement zoned SSW.

The disk drive controller 150 contains two read channels—a first read channel 152 (referring to herein as a time-based generator (TBG) read channel) and a second read channel 154 (referred to herein as a servo function generator (SFG) read channel). The TBG read channel 152 depends on a first clock 162 ("TBG clock"). The SFG read channel 154 depends on a second clock 164 ("SFG clock"). The clocks 162, 164 are related by a frequency synchronization architecture 160. The signal(s) detected at one or more of the read heads 122, 126 are transmitted as the read head(s) analog data signal 130 to the read channels 152, 154. With only one read head 122, the TBG read channel 152 and the SFG read channel 154 will receive the same analog data signal 130. For two or more read heads 122, 126, the TBG read channel 152 may receive data from only one read head 122 or 126 while the SFG read channel 154 receives data from the other read head 126 or 122. The data from the read head(s) are processed in both read channels 152, 154 which allows the disk drive controller 150 to map the disk location based on two spirals of time stamps at the same time. The disk drive controller 150 can then generate refined location data or final servo data to write using the write head 124 while the read channels 152, 154 maintain positional tracking of the disks 102.

The disk drive controller 150 also contains a laser/magnetic write head controller 170 and a read/write arm position controller 172. The laser/magnetic write head controller 170 contains circuitry to generate signals necessary to write magnetic data to the disks 102 (a heating laser, a magnetic field generator, etc.). The read/write arm position controller 172 contains circuitry to maintain, lock, and roughly track the location of the read/write arm 118 and read/write head 120 over the disks 102. The read/write arm position controller 172 outputs control signals to the spindle motor 104 and VCM 106 in response to locational needs of the read heads 122, 126 and write head 124 as determined by the disk drive controller 150.

Figure 2:
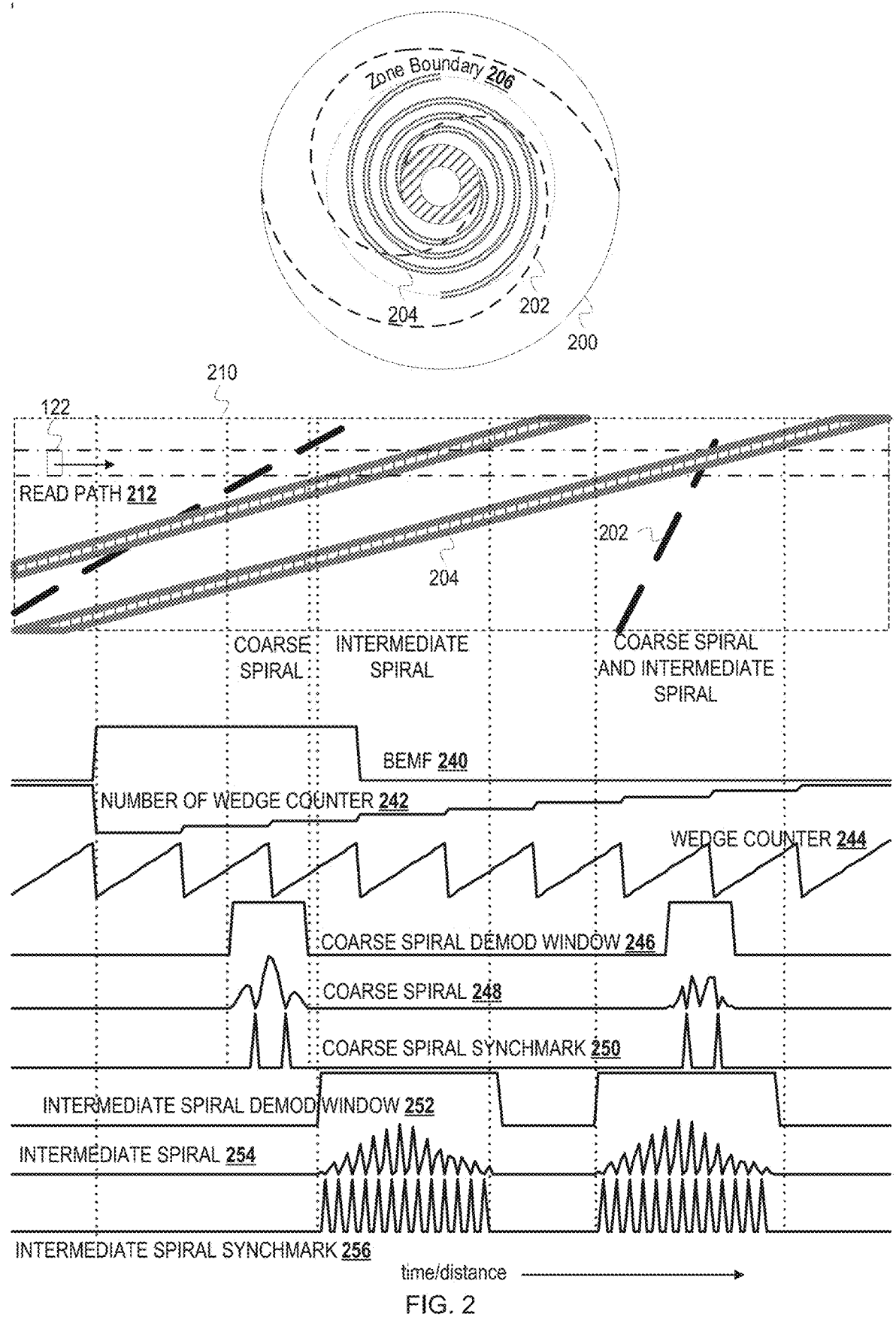
FIG. 2 depicts the disk during zoned SSW along with representative timing waveforms in both the time-based generator (TBG) and servo function generator (SFG) channels.

FIG. 2 depicts the disk during zoned SSW along with representative timing waveforms in both the time-based generator (TBG) and servo function generator (SFG) channels. The waveforms shown are simplified in order to illustrate concepts and are not to scale. A disk 200 is shown during zoned SSW with coarse spirals 202 written over the entire disk and intermediate spirals 204 written inside of zone boundary 206. The "coarse spirals" and "intermediate spirals" are both reference spirals comprising data used by the SSW system for positional tracking (e.g., time data) written in spiral patterns over a medium. The coarse spirals are referenced to write the intermediate spirals, and the intermediate spirals are referenced to write servo wedge patterns. A rectangular projection 210 of a portion of the disk 200 is shown. As the read head 122 travels along the read path 212 it encounters portions of the coarse spirals 202 and intermediate spirals 204, and portions of the disk 200 where the coarse spirals 202 and intermediate spirals 204 overlap. Each of the coarse spirals 202 and intermediate spirals 204 have time data embedded in their carrier codes, which is extracted by the disk drive controller 150 in order to give information about the read head 122 position.

As the disk 200 turns, the spindle motor 104 generates a back electromotive force (BEMF) signal 240. This signal arises from the physical parameters of the motor switching between coils as the disk rotates and is generated at constant angular positions for each disk rotation. The BEMF signal 240 generates one or more pulses per rotation, dependent upon motor parameters and motor manufacture. The BEMF 240 signal is used as a rough estimation of angular position with precision on the order of 1-10 nanoseconds.

By using the BEMF signal 240 to reset counter signals 242, 244 of each read channel an angular position tracker is generated. The counters of each channel are referred to herein as a wedge counter (WCNTR) 244 and a number-of-wedge counter (NWCNTR) 242, where the number-of-wedge counter 242 is a single counter having the ability to count the cumulative number of wedges counted by the wedge counter. Each read channel 152, 154 generates its own NWCNTR 242 and WCNTR 244 signal based on its own clock 162, 164. Assuming each written symbol in this illustration requires 4 bits, there is a relational restriction on NWCNTR 242 and WCNTR 244 where the number of clock cycles in a full disk revolution is equal to NWCNTR*WCNTR*4 for each read channel. That is, a full disk revolution contains an exact multiple of four times the number-of-total-wedges times the wedge-size of clock cycles corresponding to a whole number of written symbols.

The coarse spirals 202 are tracked in the TBG channel 152. When the read head 122 detects a signal at the coarse spiral frequency, a coarse spiral demod (demodulation) window 246 is activated. The coarse spiral signal 248 is transmitted, during the demod window, to the demodulation engine that extracts the coarse spiral synchmark 250 signal from the coarse spiral carrier frequency. The coarse spiral synchmark 250 signal contains radial and angular position data used to calculate the read head 122 location relative to the disk 200.

The intermediate spiral 204 is tracked in the SFG channel 154. When the read head 122 detects a signal at the intermediate spiral frequency, an intermediate spiral demod window 252 is activated. The intermediate spiral 254 is transmitted, during the demod window, to a demodulation engine that extracts the intermediate spiral synchmark 256 data from the intermediate spiral carrier frequency. The intermediate spiral synchmark 256 is used to better locate the read head 122 on the disk 200 since the intermediate spiral synchmark 256 contains more precise radial and angular position data than in the coarse spiral.

Because of the dual read channel architecture, both the coarse spiral 248 and intermediate spiral 254 can be demodulated when the demod windows overlap. If both signals are tracked by a single read channel, only one spiral can be preferentially demodulated when the demod windows overlap. The dual channel architecture contains dual analog to digital converters and dual demodulation engines which allows both spiral synchmark signals to be processed in parallel at the same time.

During zoned spiral SSW, the intermediate spiral 204 is preferentially written over the coarse spiral 202 where the two spirals intersect on the disk 200. In some cases, the coarse spiral 248 signal may not be detectable by the read head 122 at the intersection of the coarse spiral 202 and intermediate spiral 204 because it has been erased by the more precise timing data of the intermediate spiral 204.

Figure 3:
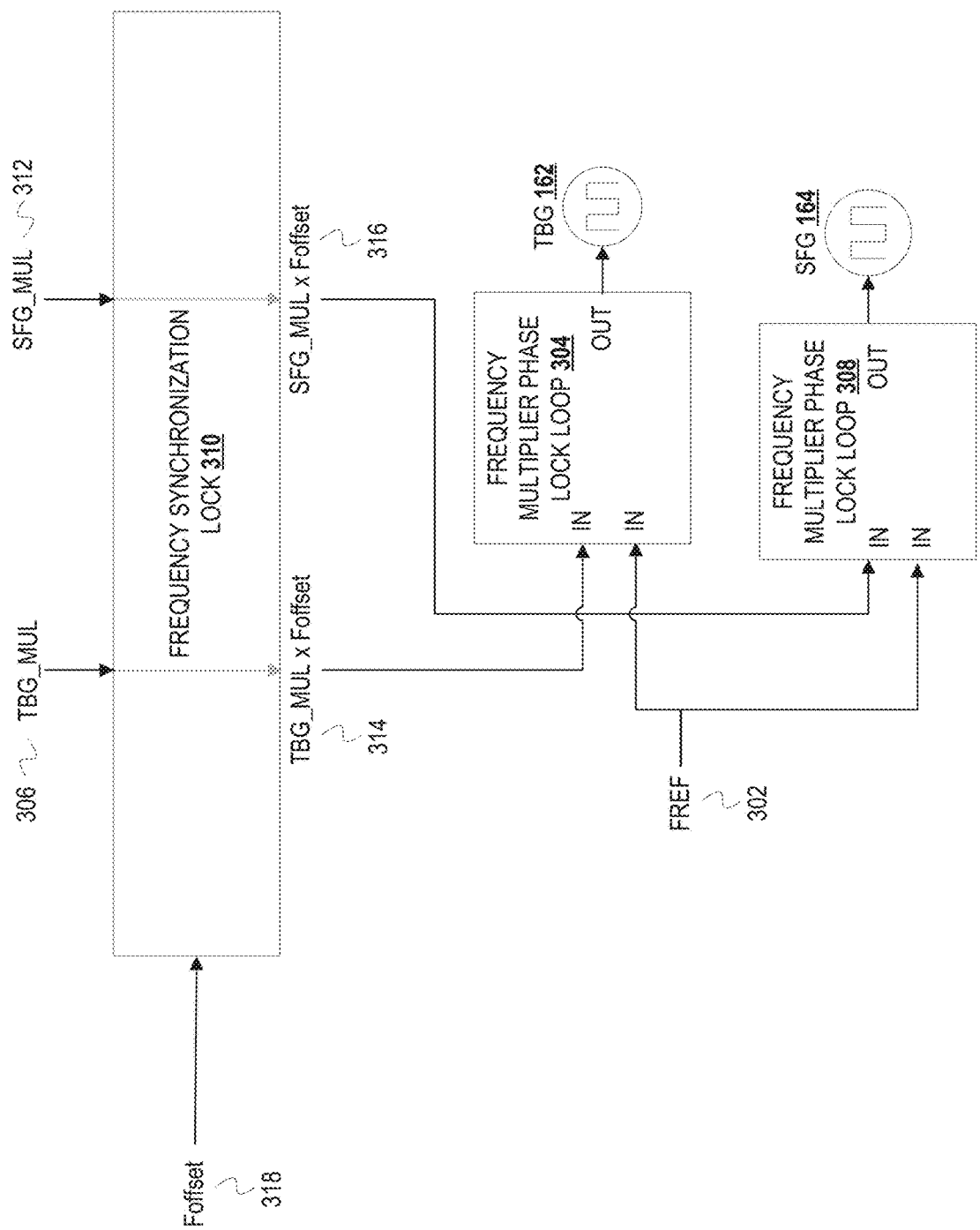
FIG. 3 depicts a parallel frequency synchronization architecture for the read channel clocks.

FIG. 3 depicts a parallel frequency synchronization architecture for the read channel clocks. A single reference frequency, FREF, 302 is multiplied up via phase lock loops (PLLs) into TBG clock 162 and SFG clock 164. When the TBG clock 162 and SFG clock 164 are in parallel, there is no multiplication of error or jitter as there would be if the SFG clock 164 was an in-series multiple of the TBG clock 162. Multiplication of jitter can be large at disk outer diameters where the SFG clock and intermediate spiral frequency are large multiples of the TBG clock and coarse spiral frequency. Instead, for parallel clocks, clock error or jitter is dependent upon the error rate of the clock itself without up multiplication.

The TBG clock 162 is produced by a frequency multiplier phase lock loop 304. PLL 304 uses a TBG_MUL×Foffset 314 input to multiply the reference frequency FREF 302. PLL 304 is also a controller locking TBG clock 162 to a set frequency. The SFG clock 164 is produced by a frequency multiplier PLL 308. PLL 308 multiplies FREF 302 by an SFG_MUL×Foffset 316 input. Because the clocks 162, 164 are in parallel and not series, their frequency offsets and multiplier factors are locked by the frequency synchronization lock 310.

Frequency synchronization lock 310 functions as a controller to lock TBG_MUL× Foffset 314 and SFG_MUL× Foffset 316 together so updates occur at the same time and to lock clock cycles to disk rotation. Frequency synchronization lock 310 generates a frequency offset, Foffset 318, that synchronizes clocks to each other and to disk rotation. Foffset 318 is calculated for each disk rotation and adjusts the clocks such that one disk rotation corresponds to a whole number multiple of clock signals and that each disk angular position corresponds to the same clock signal for each rotation. Foffset 318 can be calculated using the BEMF signal to synchronize FREF to disk rotation. The frequency synchronization lock 310 ensures that small errors in clock timing are not compounded over time, but rather reset for each disk rotation. Foffset 318 can be used to synchronize the TBG and SFG clocks to the BEMF signal and to disk rotation.

The TBG and SFG clocks are multiplied up from the reference frequency FREF. TBG_MUL 306 is the multiplier for the TBG clock, and SFG_MUL 312 is the multiplier for the SFG clock. These multipliers are reset during the SSW process when the frequencies are changed, such as when switching between intermediate spiral zones. Whenever the multiplier for one or both clocks is changed, the frequency synchronization lock 310 ensures that their frequencies remain synchronized to disk rotation.

Figure 4:
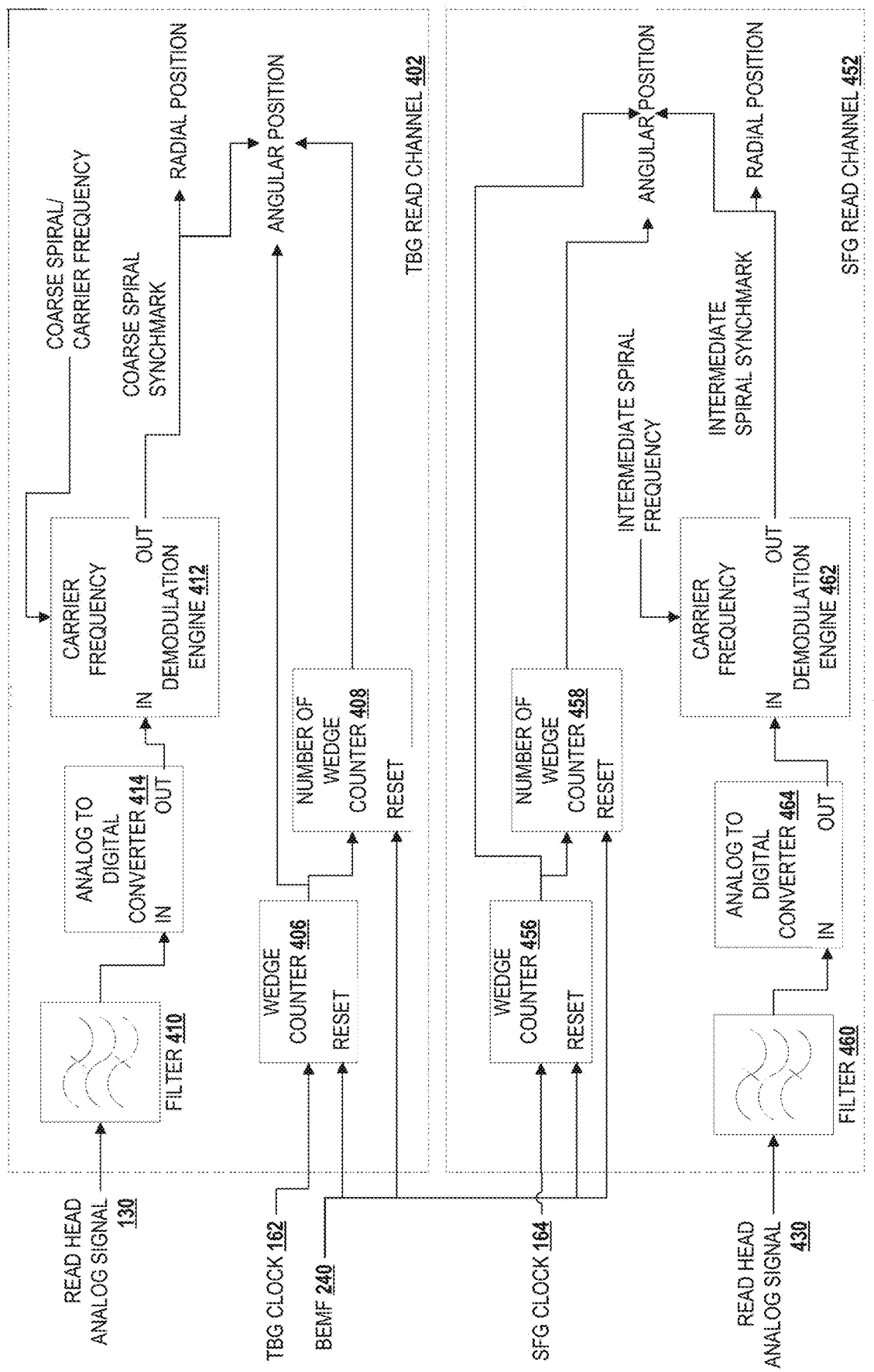
FIG. 4 depicts example components and circuitry for the dual read channel architecture for SSW.

FIG. 4 depicts example components and circuitry for the dual read channel architecture for SSW. A TBG read channel 402 is based on TBG clock 162. The read head analog signal 130 and BEMF signal 240 are also input to the TBG read channel 402. The BEMF signal 240 synchronizes two counters with the disk angular rotation—a wedge counter (WCNTR) 406 and a single counter that is a number-of-wedge counter (NWCNTR) 408. The TBG clock 162 signal flows into wedge counter 406 which is a counter (e.g., sawtooth counter) that tracks angular position inside of a wedge or angular slice of the disk. The wedge counter 406 signal flows into the number-of-wedge counter 408 which is a single counter (e.g., stepper counter) that tracks which wedge the read head is in as a measure of angular position. Both the wedge counter 406 and the single number-of-wedge counter 408 output digital signals to the microprocessor or location tracking architecture that give the read heads angular position on the disk.

The read head analog signal 130 is also processed in the TBG read channel 402. When the TBG read channel 402 tracks the coarse spiral, a bandpass filter 410 selects the portion of the read head analog signal 130 at the coarse spiral frequency. When the TBG read channel 402 is tracking another spiral frequency or concentric servo frequency, the bandpass filter 410 selects the frequency of the tracked data instead. The filtered read head signal then passes into an analog to digital converter (ADC) 414. The coarse spiral signal is converted from an analog signal to a digital signal at the ADC 414. The ADC 414 removes the envelope shape from the coarse spiral signal where the pyramidal shape is a feature of the read head passing over the spiral track obliquely. The digital coarse spiral signal then passes into a spiral demodulation engine 412. The spiral demodulation engine 412 separates the spiral synchmark data from the carrier frequency, where the carrier frequency is the coarse spiral frequency or another frequency. The demodulation engine 412 outputs the coarse spiral synchmark data to the microprocessor or location tracking architecture to determine the read head position (radial and angular components of position) on the disk. The coarse spiral synchmark data corresponds to time data written on the disk embedded in the coarse reference spiral. The processor extracts both radial and angular position information from the coarse spiral synchmark signal.

An SFG read channel 452 is based on the SFG clock 164. The read head analog signal 430 and BEMF signal 240 are also input to the SFG read channel 452. The BEMF signal 240 synchronizes two counters with disk angular rotation—a wedge counter (WCNTR) 456 and a single counter that is a number-of-wedge counter (NWCNTR) 458. The SFG clock 164 signal flows into wedge counter 456 (e.g., a sawtooth counter) and tracks angular position inside of a wedge or angular slice of the disk. The wedge counter 456 signal flows into the number-of-wedge counter 458, which is a single counter (e.g., a stepper counter) that tracks which wedge the read head is in as a measure of angular position. Both the wedge counter 456 and the single number-of-wedge counter 458 output digital signals to the microprocessor or location tracking architecture that give the read heads angular position on the disk.

Wedge counter 406 and wedge counter 456 depend on different clocks, and so will not count at the same frequency. The two number-of-wedge counters—the single number-of-wedge counter 408 and the single number-of-wedge counter 458—also depend upon different clocks, so will not count at the same frequency.

A read head analog signal 430 is also processed in the SFG read channel 452. The read head analog signal 430 can be the read head analog signal 130 or can be the read head analog signal from a different read head. When the SFG read channel 452 is tracking the intermediate spiral frequency, a bandpass filter 460 selects the portion of the read head analog signal 430 at the intermediate spiral frequency. The filtered read head signal then passes into an analog to digital converter (ADC) 464. The intermediate spiral signal is then converted from an analog to a digital signal at the ADC 464. The ADC 464 removes the envelope shape from the intermediate spiral signal where the pyramidal shape arises when the read head passes over the intermediate spiral track obliquely. The ADC 464 outputs the intermediate spiral signal to a spiral demodulation engine 462. The spiral demodulation engine 462 separates the intermediate spiral synchmark data from the carrier frequency, where the carrier frequency is the intermediate spiral frequency The intermediate spiral synchmark data is then output to the microprocessor or location tracking architecture to determine the radial and angular position of the read head on the disk. The intermediate spiral synchmark data corresponds to time data generated during the intermediate spiral writing process and embedded into the intermediate reference spirals. The processor extracts both radial and angular position information from the intermediate spiral synchmark signal.

Figure 5:
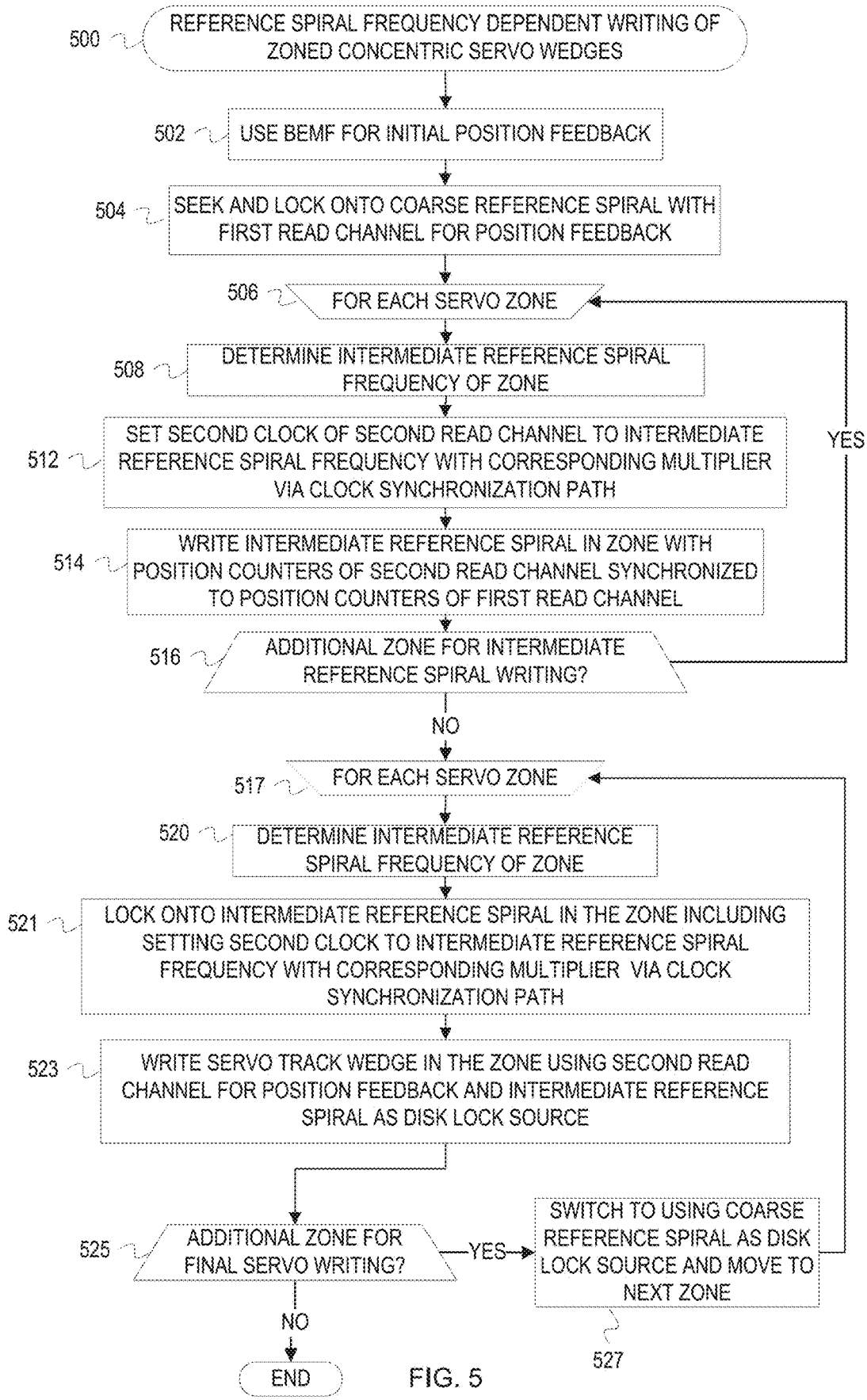
FIG. 5 is a flowchart of example operations for intermediate spiral frequency dependent writing of zoned concentric servo wedges.

FIG. 5 is a flowchart of example operations for intermediate reference spiral frequency dependent writing of zoned concentric servo wedges. Once SSW is initialized, the HDD microprocessor or controller may implement the workflow 500.

At block 502, the controller synchronizes a first clock (TBG clock) and a second clock (SFG clock) to disk rotation using the BEMF signal generated by the disk motor to adjust a frequency offset multiplier (Foffset). A first read channel (TBG read channel) dependent on the first read clock and a second read channel (SFG read channel) dependent on the second clock both contain a set of two positional counters: NWCNTR (a single counter that is a number-of-wedge counter) and WCNTR (wedge counter). These counters run at the channel clock speed and output a set of counter values used to track angular position of the disk in the synchronized read channels. This allows the controller to track a time stamp for the BEMF signal. Foffset is calculated and adjusted to maintain locking of the clock frequencies to disk rotation on the order of once per disk rotation. The synchronization lock of the first clock and the second clock to disk rotation is maintained throughout the SSW process, but the source of the offset multiplier changes throughout the process.

The controller synchronizes both the frequency offset multiplier, Foffset, and the application of the frequency multipliers for both the first and second clock via a "clock input synchronization path," which is logic that synchronizes the communication or transmission of the Foffset and multipliers to parallel clock multipliers to generate the first and second clocks. Both the first and second clock function as frequency multiples of a reference frequency, FREF, and are therefore in parallel. The first clock is a phase locked loop frequency multiple of the reference frequency multiplied by a first frequency multiplier (TBG_MUL) and the frequency offset multiplier Foffset. The second clock is a phase locked loop frequency multiple of the reference frequency multiplied by a second frequency multiplier (SFG_MUL) and the frequency offset multiplier Foffset. The controller updates Foffset (continually), and both TBG_MUL and SFG_MUL (when new values are selected) during SSW. When new values of either TBG_MUL or SFG_MUL are selected and transmitted to the clock input synchronization path, the counters NWCNTR and WCNTR are reset for the new clock frequency and re-synchronized to disk rotation so that the first and second clock maintain synchronization with each other and disk rotation.

At block 504, the controller locks on to the coarse reference spiral that is the first set of positional data written to the blank disk. The controller first selects the frequency of the coarse reference spiral and determines a value for the first clock frequency multiplier (TBG_MUL) that, when applied to the reference frequency, produces a first clock frequency equal to the coarse reference spiral frequency. The first clock is locked by PLL to the coarse reference spiral frequency. The controller then uses the first read channel to "seek" (or detect) and "learn" (or store) locations of each of the coarse reference spiral tracks as a function of the first read channel counter signals. Once the coarse reference spiral tracks are located and the locations are learned, the disk synchronization lock source is switched from the BEMF signal to the coarse reference spiral frequency and the clock input synchronization path is reset. Angular and radial position of the read head on the disk is tracked in the first read channel via spiral synchmark data and spiral amplitude signals.

At block 506, the controller selects a servo zone (grouping of concentric tracks associated with a same servo pattern frequency). The controller implements a loop in order to write zoned intermediate reference spirals over the disk. The controller generates zones with constant intermediate reference frequency—annular zones where the intermediate reference frequency is constant—based on predetermined servo zones. The controller determines zones for the intermediate reference frequency that are identical to the selected zones for the servo wedge pattern frequency—i.e. there is an exact match of intermediate reference frequency zones and servo zones. There may be many zones over the surface of the disk. Zones more proximate to the outer diameter of a disk can have a greater frequency or frequencies than those zones closer to the inner diameter of the disk.

At block 508, the controller determines a frequency for the intermediate reference spiral in the selected servo zone. The intermediate reference spiral frequency and the coarse reference spiral frequency complete a whole number of clock cycles for one disk rotation, but the controller can select an intermediate reference spiral frequency that is any multiple of the reference frequency that satisfies that condition. In workflow 500, the final written servo pattern in a zone depends upon the intermediate reference frequency, so the controller selects an intermediate reference spiral frequency for a zone based on the selected servo (pattern) frequency for that zone. The servo pattern frequency can be output at the same intermediate reference spiral frequency, or at double the intermediate reference spiral frequency because of built in redundancy in the intermediate reference spiral frequency. For the intermediate reference spiral frequency, each written symbol uses four clock cycles. The servo wedge pattern frequency only uses two clock cycles per written symbol, which produces a built-in twofold frequency multiplication. The frequency of the servo wedge pattern in the zone can be equal to the intermediate reference spiral frequency or a multiple (e.g., twice) of the intermediate reference spiral frequency.

At block 512, the controller sets the second clock and its corresponding read channel to the intermediate reference spiral frequency for the selected zone. The controller selects a second frequency multiplication factor (SFG_MUL) to set the second clock frequency to the selected intermediate reference spiral. The clock input synchronization path is updated so that the counters WCNTR and WNCNTR in both read channels are synchronized to disk rotation via Foffset calculated in the first read channel for disk rotation based on the coarse reference frequency signal. The second clock frequency remains locked to the intermediate reference spiral frequency while the controller is writing the selected zone.

At block 514, the controller writes a set of intermediate reference spirals in the selected zone. Because the counters of the first read channel (which is tracking position), and the counters of the second read channel (set to the intermediate reference frequency) are synchronized, the controller generates the intermediate reference spirals based on the location positions encoded by the coarse reference spirals and read in the first read channel. The controller produces intermediate reference spiral synchmark data based on read head location tracking in the first read channel, and outputs that signal at the second clock frequency to the write head. The location data for the intermediate reference spirals is refined and more accurate than the location data written in the coarse reference spiral, which was written based on location data produced by the less accurate BEMF signal. The controller stops the writing process at the selected zone boundary.

The intermediate reference spiral is also a ramped reference spiral. The process of writing a ramped reference spiral(s) from a first reference spiral is also called ramped spiral servo self-write or RSSW. RSSW is the process by which a ramped reference spiral is written to a disk using positional data read in a channel with a clock synchronized to disk rotation (by Foffset generated via tracking the first reference spiral).

At block 516, the controller checks the servo zones for intermediate reference spiral completeness. If the controller has written intermediate reference spirals in all the zones on the disk and no zones remain for intermediate reference spiral writing, the controller ends the servo zone loop and the SSW process continues to block 517 where a new servo zone is selected. If, however, zones remain unwritten, flow continues to block 506 and the controller initiates another loop to continue writing intermediate reference spirals across servo zones.

At block 517, the controller selects a servo zone (a zone of constant servo wedge pattern frequency). The controller implements a loop in order to write zones of servo wedge patterns across the disk. The controller determines these servo zones before the controller writes the intermediate reference spiral. The controller selects a servo zone which corresponds to a written intermediate reference spiral frequency and to a selected servo pattern frequency. The relationship between the intermediate reference spiral frequency and the selected servo wedge pattern frequency is governed by the number of clock cycles necessary to write a symbol in the intermediate reference spiral and the servo wedge pattern.

At block 520, the controller determines the intermediate reference spiral frequency for the selected zone. The intermediate reference spiral is already written in the selected servo zone.

At block 521, the controller sets the second clock to the intermediate reference spiral frequency using a frequency multiplier (SFG_MUL). The controller synchronizes the clocks via the clock input synchronization path updated with the new frequency multiplier. Using the second read channel (SFG read channel), the controller then seeks and learns the location of the intermediate spiral in relation to disk angular and radial position. The controller detects the intermediate reference spiral synchmark data and learns the locations of the intermediate reference spirals on the disk by comparing the intermediate reference spiral synchmark data to the positional data transmitted by the wedge counter signal and the signal from the single number-of-wedge counter (which tracks cumulative number of wedges counted). Once the locations of the intermediate reference spirals are known, the controller selects the intermediate reference spirals to calculate Foffset and lock both clocks to disk rotation. The controller resets and synchronizes counters WCNTR and NWCNTR via the clock input synchronization path. The controller tracks the location of the coarse reference spirals with the first read channel (TBG read channel), where the first clock remains set to the coarse reference spiral frequency, and the location of the intermediate reference spirals with the second read channel.

At block 523, the controller generates the servo wedge patterns (or concentric servo wedges) from predetermined servo wedge data at the servo wedge pattern frequency. The servo wedge pattern frequency is related to the second clock frequency (the intermediate reference spiral frequency) by the number of clock cycles that constitute a written symbol. If the written symbols of the intermediate reference spiral require four clock cycles, but the written symbols of the servo wedge pattern require two clock cycles, the servo wedge pattern written frequency can be double that of the intermediate reference spiral frequency. The use of parallel clocks allows the servo wedge sector data to be written at a stepped-up frequency relative to the intermediate reference spiral frequency. By increasing the angular frequency of data at the outer diameter, the total area occupied by the servo wedge sectors can be reduced. Although servo wedge data are used for maintaining read head positioning, the servo data occupy valuable surface area that cannot be used for written data. So, minimizing size of the space occupied by servo data increases available data storage area The data contained in a servo wedge sector (servo burst alignment marks, track data, etc.) is predetermined by the HDD parameters. The controller maintains positional lock on the disk via tracking of the intermediate reference spiral synchmark data in the second read channel. The controller writes the servo wedge pattern in servo wedge sectors in the selected zone via output to the write head at the servo wedge pattern frequency. The controller writes all the servo wedge sector data across the servo zone.

At block 525, the controller determines whether servo wedge sector writing is complete. If the servo wedge sector data are written in all the zones the servo zone loop ends and the SSW process ends. If, however, there remain zones without written servo wedge sector data, the SSW process is continued at block 527.

At block 527, the controller switches the source of Foffset that locks both parallel clocks to disk rotation. The controller selects the coarse reference spiral as tracked in the first read channel (the TBG read channel) and uses the location of the coarse reference spiral to calculate Foffset and lock the clocks to disk rotation. The coarse reference spiral contains synchmark data at a constant frequency over the entire disk and can be tracked over all zones. The flow then continues to block 517 where new servo zone is selected in the servo zone loop.

Figure 6:
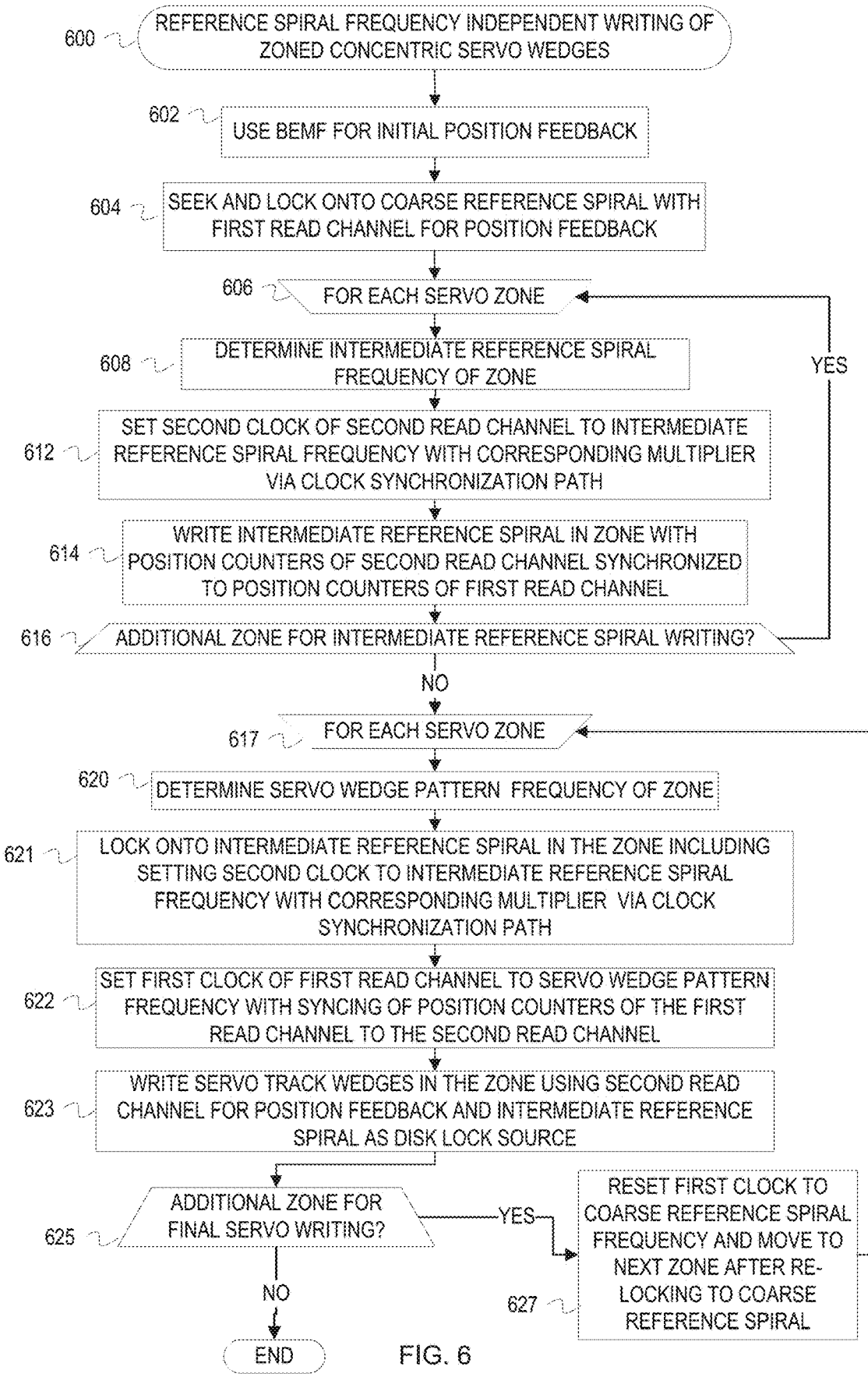
FIG. 6 is a flowchart of example operations for reference spiral frequency independent writing of zoned concentric servo wedges.

FIG. 6 is a flowchart of example operations for reference spiral frequency independent writing of zoned concentric servo wedges. Since the servo wedge pattern frequencies are independent of the intermediate reference spiral frequency, the coarse reference spiral will be reacquired when switching between zones during servo wedge sector writing. Once SSW is initialized, the HDD microprocessor or controller implements the multi-frequency workflow 600.

At block 602, the controller synchronizes a first clock (TBG clock) and a second clock (SFG clock) to disk rotation using the BEMF signal to adjust a frequency offset multiplier (Foffset). A first read channel (TBG read channel) dependent on the first read clock and a second read channel (SFG read channel) dependent on the second clock both contain positional counters: NWCNTR (the single counter that is a number-of-wedge counter) and WCNTR (the wedge counter). These counters run at the channel clock speed and output a set of counter values used to track angular position of the disk in the synchronized read channels. Foffset is calculated and adjusted to maintain locking of the clock frequencies to disk rotation on the order of once per disk rotation. The synchronization lock of the first clock and the second clock to disk rotation is maintained throughout the SSW process, but the source of the offset multiplier changes throughout the process.

The controller synchronizes both the frequency offset multiplier, Foffset, and the application of the frequency multipliers for both the first and second clock via the "clock input synchronization path". Both the first and second clock function as in-parallel frequency multiples of a reference frequency, FREF. The first clock is a phase locked loop frequency multiple of the reference frequency multiplied by a first frequency multiplier (TBG_MUL) and the frequency offset multiplier Foffset. The second clock is a phase locked loop frequency multiple of the reference frequency multiplied by a second frequency multiplier (SFG_MUL) and the frequency offset multiplier Foffset. The controller updates Foffset (continually), and both TBG_MUL and SFG_MUL (when new values are selected) during SSW. When new values of either TBG_MUL or SFG_MUL are selected and transmitted to the clock input synchronization path, the counters NWCNTR and WCNTR are reset for the new clock frequency and re-synchronized to disk rotation so that the first and second clock maintain synchronization with each other and disk rotation.

At block 604, the controller locks on to the coarse reference spiral that is the first set of positional data written to the blank disk. The controller first selects the frequency of the coarse reference spiral and determines a value for the first clock frequency multiplier (TBG_MUL) that, when applied to the reference frequency, produces a first clock frequency equal to the coarse reference spiral frequency. The first clock is locked by PLL to the coarse reference spiral frequency. The controller then uses the first read channel to "seek" (or detect) and "learn" (or store) locations of each of the coarse reference spiral tracks as a function of the first read channel counter signals. Once the coarse reference spiral tracks are located and the locations are learned, the disk synchronization lock is switched from the BEMF signal to the coarse reference spiral frequency and the clock input synchronization path is reset. Angular and radial position of the read head on the disk is tracked in the first read channel via spiral synchmark and spiral amplitude signals.

At block 606, the controller selects a servo zone. The controller implements a loop in order to write zoned intermediate reference spirals over the disk. The controller generates zones with constant intermediate reference frequency—annular zones where the intermediate reference frequency is constant—based on predetermined servo zones. The controller determines zones for the intermediate reference frequency that are identical to the selected zones for the servo pattern frequency—i.e. there is an exact match of intermediate reference frequency zones and servo zones. There may be many zones over the surface of the disk. Zones more proximate to the outer diameter of a disk can have a greater frequency or frequencies than those zones closer to the inner diameter of the disk.

At block 608, the controller determines a frequency for the intermediate reference spiral in the selected servo zone. The intermediate reference spiral frequency and the coarse reference spiral frequency complete a whole number of clock cycles for one disk rotation, but the controller can select an intermediate reference spiral frequency that is any multiple of the reference frequency that satisfies that condition. In workflow 600, the final written servo pattern in a zone does not depend upon the intermediate reference frequency, so the controller determines an intermediate reference spiral frequency for a zone based on written data density limits, or other procedural or hardware limitations.

At block 612, the controller sets the second clock and its corresponding read channel to the intermediate reference spiral frequency for the selected zone. The controller selects a second frequency multiplication factor (SFG_MUL) to set the second clock frequency to the selected intermediate reference spiral. The clock input synchronization path is updated so that the counters WCNTR and NWCNTR in both read channels are synchronized to disk rotation via Foffset calculated in the first read channel for disk rotation based on the coarse reference frequency signal. The second clock frequency remains locked to the intermediate reference spiral frequency while the controller is writing the selected zone.

At block 614, the controller writes a set of intermediate reference spirals in the selected zone. Because the counters of the first read channel (which is tracking position), and the counters of the second read channel (set to the intermediate reference frequency) are synchronized, the controller generates the intermediate reference spirals based on the location positions encoded by the coarse reference spirals and read in the first read channel. The controller produces intermediate reference spiral synchmark data based on read head location tracking in the first read channel, and outputs that signal at the second clock frequency to the write head. The location data for the intermediate reference spirals is refined and more accurate than the location data written in the coarse reference spiral, which was written based on location data produced by the less accurate BEMF signal. The controller stops the writing process at the selected zone boundary.

At block 616, the controller checks the servo zones for intermediate reference spiral completeness. If the controller has written intermediate reference spirals in all the zones on the disk and no zones remain for intermediate reference spiral writing, the controller ends the servo zone loop and the SSW process continues to block 617 where a new servo zone is selected. If, however, zones remain unwritten, flow continues to block 606 and the controller initiates another loop to continue writing intermediate reference spirals across servo zones.

At block 617, the controller selects a servo zone (a zone of constant servo wedge pattern frequency). The controller implements a loop in order to write zones of servo wedge patterns across the disk. The controller determines these servo zones before the controller writes the intermediate reference spiral and uses the same servo zones to zone the servo wedge pattern frequency. The controller selects a servo zone which corresponds to a written intermediate reference spiral frequency and to a servo pattern frequency.

When the flow first enters the loop through block 617, the first clock is synchronized to the coarse reference spiral frequency at completion of the intermediate reference spiral writing. Upon additional iterations of the loop, the first clock (TBG clock) is resynchronized to the coarse reference spiral frequency before it starts another loop at block 617. The controller uses the coarse reference spiral tracked in the first read channel to move the read head between servo zone in order to locate the selected servo zone at the determined intermediate reference frequency. The controller learns the location of the coarse reference spiral data by reading the coarse reference spiral synchmark data and comparing to the angular position data in the first read channel, which is a function of WCNTR and NWCNTR output signals. The parallel clocks are locked to disk rotation via Foffset calculated from the coarse reference spiral. From the coarse spiral location data, the controller locates the intermediate spiral in the selected zone.

At block 620, the controller determines a servo wedge pattern frequency for the selected zone. The first clock (TBG clock) will be reset to the servo wedge pattern frequency in the selected servo zone. The servo wedge pattern frequency can be any frequency sufficient for a complete disk rotation to contain only whole symbols. For an example in which a whole symbol is written in four clock cycles, the relationship below holds:

TBG_WCNTR_*TGT*×TBG_NWCNTR_*TGT*×4=# of
    TBG clock cycles in 1disk rotation

SFG_WCNTR_*TGT*×SFG_NWCNTR_*TGT*×4=# of
    SFG clock cycles in 1disk rotation

That is, the target size-of-wedges times the target number-of-wedges times four equals the number of clock cycles in exactly one disk rotation for each clock. The concentric servo wedge (servo wedge pattern) frequency is not restricted by a relationship to the intermediate reference spiral frequency. The value four is an example symbol size.

At block 621, the controller acquires the intermediate reference spiral in the selected zone. The controller phase loop locks the second clock to the intermediate reference clock frequency by selecting the second frequency multiplier (SFG_MUL) to multiply the reference frequency FREF. The controller learns the location of the intermediate reference spiral data by reading, in the second read channel, the intermediate reference spiral synchmark data and comparing to the angular position data in the second read channel, which is a function of WCNTR and NWCNTR output signals. The parallel clocks are then locked to disk rotation via Foffset calculated from the intermediate reference spiral. The parallel clocks are locked to disk rotation and each other using the clock input synchronization path based off the frequency offset calculated from the intermediate reference spiral. The controller maps the servo zone using the synchronized clocks.

At block 622, the controller implements a PLL to lock the first clock (TBG clock) to the servo (wedge) pattern frequency determined for the selected servo zone. The controller outputs a first frequency multiplier (TBG_MUL) that multiplies the reference frequency FREF up to the selected servo pattern frequency. The first read clock channel no longer tracks information about the location of the coarse reference spiral. The locational tracking and calculation of Foffset occur in the second read channel at the intermediate reference spiral frequency. The counters WCNTR and NWCNTR in both read channels are synchronized at the new values of the frequency multipliers.

At block 623, the controller writes the servo wedge sectors in the selected servo zone. The location of the read head is determined in the second read channel (SFG read channel) from the spiral synchmark data of the intermediate reference spirals as tracked by the positional wedge counters WCNTR and NWCNTR. The concentric servo pattern (servo wedge pattern) written in the servo wedge sector (servo burst alignment marks, track data, etc.) is predetermined by the HDD parameters. The use of parallel clocks allows the servo wedge sector data to be written at a stepped-up frequency relative to the intermediate reference spiral frequency, which itself is stepped up from the coarse reference spiral frequency. By increasing the angular frequency of data at the outer diameter, the total area occupied by the servo wedge sectors can be reduced. Although servo wedge data are used for maintaining read head positioning, the servo data occupy valuable surface area that cannot be used for written data. So, minimizing size of the space occupied by servo data increases available data storage area. The controller maintains positional lock on the disk via tracking of the intermediate reference spiral synchmark data in the second read channel. Foffset, which locks the clocks to disk rotation, is calculated from the refined positional data of the intermediate reference frequency. The controller writes the servo wedge pattern in servo wedge sectors in the selected zone by outputting the servo wedge patterns to the write head at the servo wedge pattern frequency which is maintained by the first clock (TBG clock). The controller writes all the servo wedge sector data across the servo zone.

At block 625, the controller determines whether servo wedge sector writing is complete. If the servo wedge sector data are written in all the zones the servo zone loop ends and the SSW process ends. If, however, there remain zones without written servo wedge sector data, the SSW process is continued at block 627. At block 627, the controller resets the first clock to the coarse reference spiral frequency. The controller resets the first frequency multiplier (TBG_MUL) and selects a new frequency multiplier such that the first clock frequency is phase loop locked to the coarse reference spiral frequency. The controller updates clock input synchronization lock based on the new multiplier values. The controller uses the coarse reference spiral as tracked in the first read channel to move the read head between servo zones in order to locate the selected servo zone at the determined intermediate reference frequency. The controller learns the location of the coarse reference spiral data by reading the coarse reference spiral synchmark data and comparing to the angular position data in the first read channel (from WCNTR and NWCNTR output signals). The parallel clocks are locked to disk rotation via Foffset calculated from the coarse reference spiral. From the coarse spiral location data, the controller locates the intermediate spiral in the selected zone.

The multi-frequency workflow 600 allows for more freedom in concentric servo (servo wedge pattern) frequency. However, this freedom is obtained by reacquiring the coarse spiral at each new intermediate spiral frequency zone during concentric servo writing.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 606 and 608 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for zoned SSW with concentric servo frequency step up as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. A storage device comprising:
a first phase lock loop (PLL) and a second PLL in parallel,
the first PLL configured to receive a reference clock input and a first input and configured to output a first clock signal;
the second PLL configured to receive the reference clock input and a second input and configured to output a second clock signal;
a synchronization logic connected to output a first frequency multiplier and a frequency offset as the first input to the first PLL and connected to output a second frequency multiplier and the frequency offset as the second input to the second PLL, wherein the synchronization logic is configured to synchronize output to the first PLL with output to the second PLL; and
a controller configured with program code executable by the controller to cause the storage device to write concentric servo tracks on a machine-readable medium at successively increasing clock frequencies while using the second clock signal for position feedback.

2. The storage device of claim 1 further comprising:
a first read channel configured to receive the first clock signal; and
a second read channel configured to receive the second clock signal and to generate the position feedback.

3. The storage device of claim 2, wherein the first read channel comprises first and second counters to generate first angular position data based, at least in part, on the first clock signal and the second read channel comprises first and second counters to generate second angular position data based, at least in part, on the second clock signal.

4. The storage device of claim 2, wherein the second read channel is also configured to receive as input an analog signal from a read head, wherein the second read channel comprises an analog-to-digital converter to convert the analog signal to a digital signal and a demodulation engine to demodulate the digital signal based on an intermediate reference spiral frequency, wherein the position feedback includes angular and radial position data extracted from the digital signal.

5. The storage device of claim 2, wherein the controller configured with program code to write concentric servo tracks at successively increasing clock frequencies while using the second clock signal for position feedback comprises the controller being configured with the program code to seek and learn intermediate reference spirals on the machine-readable medium, wherein the position feedback is based on the intermediate reference spirals.

6. The storage device of claim 2, wherein the controller configured with program code to write concentric servo tracks at successively increasing clock frequencies comprises the controller being configured with the program code to supply successively increasing second frequency multipliers for progression of self-servo writing from an inner diameter zone to an outer diameter zone.

7. The storage device of claim 6, wherein the successively increasing clock frequencies at which the concentric servo tracks are written are each a multiple of a corresponding one of intermediate reference spiral frequencies implemented by the second clock signal after locking onto intermediate reference spirals written on the machine-readable medium.

8. The storage device of claim 2, wherein the controller configured with self-servo writing program code to write concentric servo tracks at successively increasing clock frequencies while using the second clock signal for position feedback comprises the controller configured with the program code to determine a servo pattern writing frequency for each zone, wherein the servo pattern writing frequency increases across zones from an inner diameter zone to an outer diameter zone.

9. The storage device of claim 8,
wherein the first read channel comprises first and second counters to generate first angular position data based, at least in part, on the first clock signal and the second read channel comprises first and second counters to generate second angular position data based, at least in part, on the second clock signal,
wherein the controller configured with self-servo writing program code to write concentric servo tracks at successively increasing clock frequencies while using the second clock signal for position feedback comprises the controller being configured with the program code to, for each zone,
supply to the synchronization logic as the first frequency multiplier a frequency multiplier corresponding to a frequency at which an intermediate reference spiral was written in the zone and lock on to the intermediate reference spiral using the second read channel; and
set the first clock signal to the servo pattern writing frequency of the zone and synchronize first and second counters of the first read channel to the first and second counters of the second read channel.

10. A storage device comprising:
a read/write head assembly;
a set of one or more machine-readable media;
a first read channel and a second read channel;
a first clock generator and a second clock generator connected in parallel to a synchronization logic, the first clock generator coupled to supply a first clock signal to the first read channel and the second clock generator coupled to supply a second clock signal to the second read channel,
the synchronization logic configured to receive frequency multipliers and a frequency offset and connected to supply the frequency offset and a first frequency multiplier to the first clock generator and to supply the frequency offset and a second frequency multiplier to the second clock generator, wherein the synchronization logic is also configured to synchronize supplying of the frequency offset and the first frequency multiplier to the first clock generator with supplying of the frequency offset and the second frequency multiplier to the second clock generator; and
a controller comprising self-servo writing program code executable to control the read/write head assembly to write a set of zoned intermediate reference spirals onto the set of one or more machine-readable media while using a set of coarse reference spirals for positional feedback and a set of zoned servo wedges onto the set of one or more machine-readable media while using the set of zoned intermediate reference spirals for position feedback.

11. The storage device of claim 10, wherein the first and second clock generators are coupled to each receive as input a reference frequency, wherein the first clock generator steps up the reference frequency based on the first frequency multiplier and the frequency offset and the second clock generator steps up the reference frequency based on the second frequency multiplier and the frequency offset.

12. The storage device of claim 10, wherein the first clock generator and the second clock generator are phase lock loops.

13. The storage device of claim 10, wherein the program code executable by the controller to control the read/write head assembly to write the set of zoned servo wedges comprises program code executable by the controller to determine servo pattern frequencies for writing the set of zoned servo wedges across zones, wherein the servo pattern frequencies increase from an inner diameter zone to an outer diameter zone.

14. The storage device of claim 10, wherein the first read channel comprises first and second counters to generate first angular position data based, at least in part, on the first clock signal and the second read channel comprises first and second counters to generate second angular position data based, at least in part, on the second clock signal.

15. The storage device of claim 10, wherein the program code executable by the controller to write the set of zoned servo wedges onto the set of one or more machine-readable media while using the set of zoned intermediate reference spirals for position feedback comprises program code executable by the controller to determine, for each zone, a frequency at which one or more of the zoned intermediate reference spirals was written into the zone and supply to the synchronization logic as the second frequency multiplier a frequency multiplier corresponding to the frequency at which the one or more of the zoned intermediate reference spirals was written into the zone.

16. The storage device of claim 15, wherein a servo wedge pattern frequency of each zone is a multiple of the frequency at which the one or more of the zoned intermediate reference spirals was written into the zone.

17. The storage device of claim 15, wherein a servo wedge pattern frequency of each zone is independent of the frequency at which the one or more of the zoned intermediate reference spirals was written into the zone.

18. The storage device of claim 17,
wherein the first read channel comprises first and second counters to generate first angular position data based, at least in part, on the first clock signal and the second read channel comprises first and second counters to generate second angular position data based, at least in part, on the second clock signal,
wherein the program code to write the set of zoned servo wedges onto the set of one or more machine-readable media while using the set of zoned intermediate reference spirals for position feedback comprises program code executable by the controller to,
for each zone,
supply to the synchronization logic as the second frequency multiplier a frequency multiplier corresponding to a frequency at which one or more of the zoned intermediate reference spirals was written in the zone and lock on to the one or more intermediate reference spirals using the second read channel; and
set the first clock signal to the servo wedge pattern frequency of the zone and synchronize first and second counters of the first read channel to the first and second counters of the second read channel.

19. A method of self-servo writing comprising:
repeatedly synchronizing supplying of frequency multipliers and a frequency offset for generating a first clock signal and a second clock signal in parallel; and
writing onto a machine-readable medium of a storage device servo wedges while using coarse reference spirals to move between zones and intermediate reference spirals in each zone for position feedback,
wherein the coarse reference spirals are located and tracked based, at least in part, on the first clock signal, wherein the intermediate reference spirals are written and tracked based, at least in part, on the second clock signal.

20. The method of claim 19, wherein repeatedly synchronizing supplying of frequency multipliers and a frequency offset for generating the first clock signal and the second clock signal in parallel comprises supplying the frequency multipliers and the frequency offset to synchronization logic that synchronizes inputs to phase lock loops that generate the first and second clock signals in parallel.

* * * * *